United States Patent [19]

Owens

[11] Patent Number: 5,911,885
[45] Date of Patent: Jun. 15, 1999

[54] APPLICATION OF MICROWAVE RADIATION IN A CENTRIFUGE FOR THE SEPARATION OF EMULSIONS AND DISPERSIONS

[76] Inventor: Thomas L. Owens, 631 Sylvan Ct., Batavia, Ill. 60510

[21] Appl. No.: 08/901,885

[22] Filed: Jul. 29, 1997

[51] Int. Cl.⁶ .......................... B01D 35/06; B01D 17/038
[52] U.S. Cl. .......................... 210/748; 210/787; 210/806; 204/155; 204/554; 208/402; 219/678; 219/690; 494/37
[58] Field of Search ..................................... 210/748, 787, 210/806, 243, 360.1, 380.1; 166/248; 208/402; 494/13, 37; 204/155, 554, 557, 660, 664; 219/678, 690

[56] References Cited

U.S. PATENT DOCUMENTS

| | | | |
|---|---|---|---|
| 4,013,558 | 3/1977 | Rosenberg | 210/243 |
| 4,582,629 | 4/1986 | Wolf | 252/348 |
| 4,810,375 | 3/1989 | Hudgins et al. | 210/112 |
| 4,853,119 | 8/1989 | Wolf et al. | 210/181 |
| 4,853,507 | 8/1989 | Samardzija | 219/10.55 A |
| 5,055,180 | 10/1991 | Klaila | 208/402 |
| 5,211,808 | 5/1993 | Vilardi et al. | 159/6.1 |
| 5,222,543 | 6/1993 | Carlstrom et al. | 164/114 |
| 5,344,493 | 9/1994 | Jackson | 134/1 |
| 5,368,171 | 11/1994 | Jackson | 134/147 |

OTHER PUBLICATIONS

D.A. Purta, "Application of Microwaves to the Separation of Oil–Water Sludges," EPRI CMP Report No. 92–6, Jul., 1992.

C.S. Fang, P. Lai, B. Chang, W.J. Klaila, "Oil Recovery and Waste Reduction by Microwave Radiation," *Environmental Progress*, vol. 8, No. 4, pp. 235–238, Nov., 1989.

Staff, "Radiowave–Based Process Recovers Oil from Sludge at Texas Site," *Oil and Gas Journal*, Dec. 2, 1996.

*Primary Examiner*—David A. Reifsnyder

[57] ABSTRACT

A method and apparatus for applying microwaves to flowable materials within a centrifuge are disclosed. The simultaneous application of microwaves and centrifugation to flowable materials may be utilized to rapidly separate immiscible components from emulsions and dispersions. Microwaves are guided along a waveguide structure within the centrifuge. A meandering path for the waveguide is chosen through the interior of the centrifuge and through the flowable material being centrifuged. Gradual variation in the radial distance of the waveguide from the axis of the centrifuge produces a gradual filling of the cross-section of the waveguide along its length, forming a gentle microwave beach within the waveguide. Excellent microwave coupling and power deposition into the flowable material results. There is no need to contain the flowable material behind a dielectric barrier, normally placed between the incident microwaves and the flowable material, since confinement is provided by centrifugal forces. In its most general sense, the invention may be used to separate any variable-density flowable material, whether emulsified or not, or it may be used simply to rapidly heat a fluid without separation. Numerous applications exist in the petroleum, chemical, and food-processing industries.

10 Claims, 3 Drawing Sheets

APPLICATION OF MICROWAVE RADIATION IN A CENTRIFUGE FOR THE SEPARATION OF EMULSIONS AND DISPERSIONS

FIELD OF THE INVENTION

This invention relates generally to a method and apparatus for applying microwaves to a flowable material while it is being centrifuged and in particular, but not by way of limitation, it relates to the application of microwaves to an emulsion or a dispersion in order to enhance separation of immiscible components through direct microwave heating and through microwave destabilization or reduction of interfacial forces holding immiscible components in suspension.

BACKGROUND OF THE INVENTION

The discovery of enhanced separation of oil-water emulsions and dispersions using microwave radiation was first disclosed in 1986 by N. O. Wolf in U.S. Pat. No. 4,582,629. In this disclosure, Wolf demonstrated through several bench-top experiments that modest amounts of microwave power applied to oil-water emulsions could increase oil-water separation rates by more than a factor of two compared to simple heating alone. Results suggested that microwaves were enhancing the separation rate through a mechanism distinct from heating alone. Wolf postulated that microwaves were successful because of direct heating of the bulk of the emulsion and disruption of surfactant molecules present in the interfacial film.

Since Wolf's pioneering work, independent confirmation of his general results were obtained by several researchers. For example, D. A. Purta with the support of the EPRI Center for Materials Production developed a novel apparatus for testing continuous separation of emulsions using microwave radiation. Purta found significant reduction in the time required to separate oil and water phases of emulsions using only small amounts of microwave energy and with temperature rises of only 20 degrees C.

A research report, prepared by C. S. Fang, B. Chang, P. Lai, and W. J. Klaila, presented systematic data on the effectiveness of microwave radiation in separating water-oil mixtures and emulsified oil-water-solid sludges. The authors concluded that microwave radiation was more effective in heating thick, viscous emulsions than gas or oil-fired heaters. Enhanced emulsion breaking with microwave radiation was also reported. They found evidence that enhanced separation rates were due to reduction of the zeta potential, which suspends water droplets and solid particles in an emulsion.

Following the original disclosure of Wolf, a comprehensive series of patents were generated which disclosed novel concepts for applying microwaves to oil-water emulsions. Among these are U.S. Pat. Nos. 4,853,507; 5,055,180; 4,810,375; and 4,853,119. All of these patents assert the advantages of enhanced emulsion breaking properties through the application of microwave radiation. While generally applicable to any type of emulsion or suspension, one of the largest potential users of microwave-enhanced emulsion breaking technologies is the petroleum industry. Most of the patents referenced previously discuss applications in this specific industry.

In the petroleum industry, crude oil pumped from wells is typically co-mingled with suspended solids and water. Since the water and solids present problems if contained in refinery feedstocks, it is necessary to remove these components. The separation of oil from water and solids using gravitational settling methods is typically incomplete. The unseparated left-over materials are waste products consisting of stable oil/water emulsions mixed with solid minerals.

These crude-oil by-products are generated in large quantities. It has been estimated that more than 2% of the crude oil currently pumped from the ground takes the form of these stable oil-water emulsions mixed with solids, forming crude oil sludges. Having no value to oil producers, the sludges are ejected into open pits and ponds or are left temporarily in large crude oil storage tanks. The sludges are presenting an ever-worsening remediation problem to oil producers and refiners.

Traditional methods to separate oil/water emulsions include application of heat, microbial breakdown, centrifugation, and chemical addition. Most of these methods do not recover marketable product. They provide only partial separation and typically leave large amounts of waste that must be carefully disposed of in accordance with strict government regulations. Heating is usually carried out by gas or oil-fired heaters. Conventional heating methods have problems with slow heat transfer into thick sludges, accumulation of heavy layers of solid residue on heat transfer surfaces, and loss of valuable volatiles. Chemical demulsifiers, such as alum and polyamines, are available to break oil-water emulsions, but these chemicals are subject to very restrictive regulations on discharge to public water. In addition, chemical treatment can be a relatively slow process that does not provide high levels of separation of some emulsions.

Microwaves work very effectively in crude-oil sludge separation, since microwaves penetrate deeply into the interior of thick sludges without heated-surface contact, providing a very effective heating alternative, irrespective of enhanced separation mechanisms. As the sludge is heated, viscosity is lowered, and rapid coalescence of liquid phases takes place. Once the liquid phases coalesce, separation occurs through natural gravity or through centrifugation. No chemicals are needed to force separation.

Considerable effort has been devoted to field-testing of pilot systems to process these crude-oil sludges using microwave energy. In one field-test, results were published in which 98–99% of hydrocarbons were recovered from sludge. The recovered oil can be sold as high-quality crude which can be refined without further treatment. The microwave separation process is also cost-effective. One company estimated that the microwave separation process, when fully developed, will cost less than half of the price of other sludge-separation processes.

One of the principal obstacles to commercialization of the technology has been the need for major innovations in the microwave applicator, which couples microwave power into the emulsions. Current systems experience major difficulties with microwave component failure and power coupling inefficiencies. The most widely used approach to applying microwave radiation to oil-water emulsions involves formation of various tapered or conical dielectric barriers which direct and shape the flow of the emulsions. The various shapes are intended to create gradually changing conditions for microwave energy flux in order to minimize microwave reflections from the emulsions and the dielectric barriers, and maximize microwave power absorption into the emulsions.

A dielectric absorber which produces a gradually changing environment for microwaves over distances greater than or on the order of a wavelength in the direction of microwave propagation will be referred to throughout this disclosure as a microwave beach. The gradually changing environment for microwaves along a microwave beach is analogous to the gradually changing depth of water as ocean waves approach an ocean beach. Just as ocean waves are effectively absorbed along an ocean beach because of the gradual change in water depth, so are microwaves effectively absorbed along a microwave beach because of the gradual change in environment presented to the microwaves.

The effective manner in which microwaves are absorbed in a microwave beach is well known in the microwave industry. Tapered and conical beach configurations, utilizing water as the absorptive medium, form low-reflectance terminations or dummy loads in many high-power microwave systems. In microwave transmission applications, gradual transitions are often used to reduce or eliminate microwave reflections between differing waveguide elements. These gradual transitions share with microwave beaches the feature of a gradually changing microwave environment that produces low microwave reflections.

Several major difficulties have been encountered in the adaptation of microwave beach configurations to crude-oil emulsions. First of all, the real part of the relative dielectric permittivity of dehydrated crude oil can be as little as 2 or 3 and the imaginary part of the permittivity can be less than 0.05. Microwave beaches in this situation are very long. While the dielectric constants of emulsions which have a high water content may be much higher, and the beaches much shorter, designs must account for the extreme cases to be effective in all situations. The long dielectric barriers required in extreme-case designs become very difficult to manufacture and considerable space is required to contain the long devices. This is not an issue when pure water is the absorptive medium, since water has a real dielectric permittivity of nearly 80 and an imaginary permittivity of 1–12, depending upon the frequency.

Attempts have been made to produce imperfect short beaches, which lower reflections to some extent. The remaining reflections are then further reduced with stub tuners. These designs have not been entirely satisfactory. Tuning in this situation can be difficult, because of the highly-variable dielectric properties of many emulsions, including crude-oil emulsions. The properties may change on a rapid time scale as new material is introduced into the system under high-flow-rate conditions. Dielectric properties may also change as the emulsion separates, and as the emulsion is heated. Rapidly changing dielectric properties necessitate rapid tuning adjustments, but these adjustments are difficult to make using relatively slow mechanical tuning mechanisms. In extreme situations, the variations in dielectric properties of the emulsions may even induce frequency variations in the microwave source if a magnetron oscillator is used. This frequency variation within the microwave source makes satisfactory tuning virtually impossible.

Finally, beach designs have required a dielectric barrier to contain and shape the emulsion. The presence of the barrier has led to numerous problems. For example, in short-beach configurations, portions of the barrier have been rapidly coated with thick residues from the microwave-heated emulsions. The presence of these residues is indicative of localized overheating of the emulsion and strong adherence of sludge components. These residues can be strong absorbers of microwave power, leading to strong localized heating of the barrier and further localized heating of regions of the emulsion in contact with the heated residues. Numerous barrier failures have been attributed to thermal stresses resulting from this strong localized heating brought about by microwave absorption in the barrier coating.

We disclose here a novel microwave applicator for emulsion breaking that overcomes these technical difficulties, and is capable of directly processing sludges and emulsions having a wide range of viscosities and material composition. Our disclosed solution will provide an attractive alternative to current methods, bolstering commercialization efforts and promoting widespread use of microwave emulsion breaking technologies in areas such as crude-oil sludge remediation and oil recovery. In these areas, the value of our disclosed technology is considerable in terms of environmental impact alone. In addition, the recovery of considerable quantities of useable oil from crude-oil sludges will have far-reaching economic benefits.

SUMMARY OF THE INVENTION

The invention integrates a gentle microwave beach into a rotating centrifuge. Microwaves are guided along a waveguide structure within the centrifuge. A meandering path for the waveguide is chosen through the interior of the centrifuge and through the flowable material being centrifuged. Gradual variation in the radial distance of the waveguide from the axis of the centrifuge produces a gradual filling of the cross-section of the waveguide along its length, forming a gentle microwave beach within the waveguide. Excellent microwave coupling and power deposition into the flowable material results. There is no need to contain the flowable material behind a dielectric barrier, normally placed between the incident microwaves and the flowable material, since confinement is provided by centrifugal forces.

In a specific embodiment, the microwave beach consists of a waveguide channel, wrapped around the interior of the centrifuge in an expanding-helix or elongated-spiral configuration. Under the action of centrifugal forces, the fluid level settles to a constant radial distance from the axis of the centrifuge. In this circumstance, a gradual change in radial distance from the axis of the centrifuge along the length of the waveguide helix creates a gradually changing depth of fluid within the confines of the waveguide channel, as the waveguide and fluid rotate. Microwaves propagate along the expanding helical path within the confines of the waveguide channel. The gradual change in fluid depth within the waveguide channel provides a gentle microwave beach configuration for microwaves introduced into the shallow-fluid end of the waveguide helix. The meandering helical path of the waveguide permits formation of a very long microwave beach within a compact device.

The fluid shape of the emulsion which forms the dielectric portion of the microwave beach is maintained by centrifugal force rather than by confinement within a dielectric barrier. The absence of dielectric barriers and the use of all-metal construction, will eliminate problems of dielectric barrier coating and associated thermal stresses described above for current devices. The gradual beach configuration will assure that there are negligible microwave reflections for all possible variations of dielectric properties of the emulsions. Variable tuning equipment will not be required. Negligible reflections will occur no matter how fast the dielectric properties of the emulsion change as new material is introduced into the system, as the fluid separates or as the fluid is heated. In addition, microwave power can be distributed quite evenly over a considerable surface area in the proposed gentle beach configuration, resulting in low power flux and eliminating regions of strong localized microwave absorption and emulsion overheating.

Although a centrifuge is utilized in the proposed concept primarily to hold the shape of the emulsion in a helical or elongated-spiral beach configuration, high-speed centrifugation may be utilized to create large centrifugal forces driving rapid separation of the emulsion within the centrifuge. In addition, large centrifugal forces will permit direct processing of very thick, viscous emulsions in the device. This very attractive feature of the proposed device becomes possible because the large centrifugal forces make thick emulsions conform to nearly the same fluid shape as low viscosity fluids, maintaining a constant beach configuration for a wide range of emulsion viscosities.

Finally, by perforating the walls of the waveguide, solids can exit the fluid contained within the expanding-helix waveguide and migrate to the wall of the centrifuge. Proper placement and sizing of these perforations will not greatly affect microwave propagation and microwave containment within the waveguide channel. A helical or screw conveyor mechanism placed between the waveguide channel and the outside wall of the centrifuge may be utilized to remove the solids as they collect along the walls of the centrifuge. Our proposed conceptual design for the helical conveyor is an adaptation of a similar helical conveyor concept utilized in conventional sludge separators. A scroll conveyor, commonly utilized in other sludge separators, may also be utilized to remove solids which collect along the outer wall of the centrifuge.

Other disclosures of methods and apparatus for applying microwaves to materials contained within a centrifuge are given in U.S. Pat. Nos. 5,211,808; 5,222,543; 5,344,493; and 5,368,171. It is to be understood that none of these prior disclosures describe a method or apparatus for applying microwaves to flowable materials within a centrifuge using a rotating microwave beach contained within the centrifuge. This novel and unobvious feature leads to a considerable reduction of microwave reflectance over a wide range of dielectric properties of the flowable material without the need for dynamic variable tuning equipment. Better distribution of microwave power within the flowable material is also achieved compared to prior art methods and devices.

The term "microwaves" commonly refers to electromagnetic waves encompassing the frequency range of approximately 300 MHz to 300 GHz. While applications of the invention are believed to be most practical over this frequency range, it is possible to utilize the invention over frequencies outside this range. The invention is therefore not limited to any particular frequency range and the term "microwaves" should be construed within the context of this disclosure to mean any electromagnetic wave that can utilize a microwave beach within a centrifuge. Very practical and preferred frequencies are in the vicinity of 915 MHz and 2,450 MHz, where ample industrial microwave power is available and where industrial operations constitute the primary use, as designated by the FCC.

DETAILED DESCRIPTION OF THE INVENTION

The invention discloses the formation of a gentle microwave beach within a centrifuge for applying microwaves to a flowable material. As already discussed, to form the beach, a waveguide is configured to follow a rotating meandering path within the centrifuge in such a way that the flowable material gradually fills the waveguide cross-section. In the present detailed description, a specific example is disclosed in which the meandering path is a helical path having an expanding radius along the helix and where the axis of the helix coincides with the axis of the centrifuge.

Figure 1:
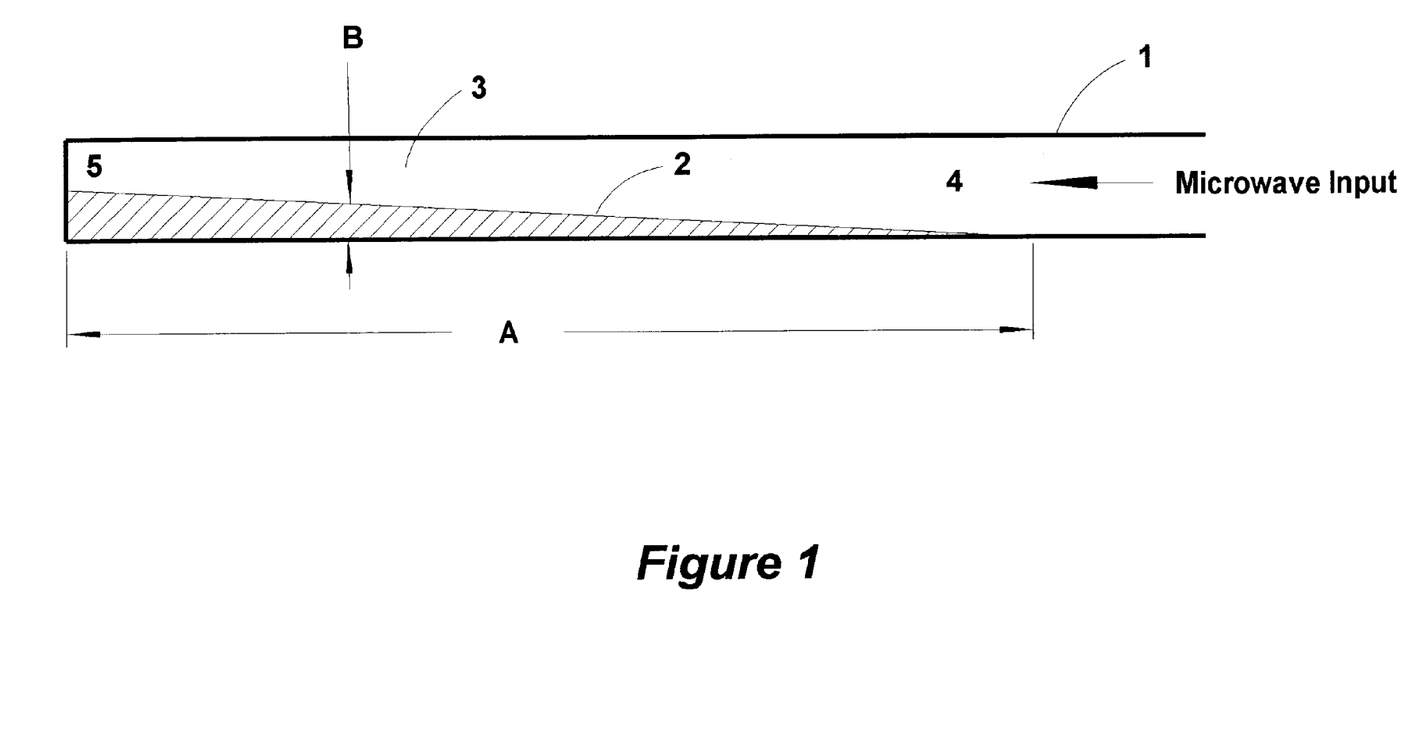
FIG. 1 is a schematic diagram of a simple gentle-beach microwave absorber which uses a linear waveguide.

To lay the groundwork for a discussion of these meandering-waveguide beach geometries, the general concept of a microwave beach is illustrated schematically in FIG. 1 for the simple case of a linear-waveguide beach configuration. In FIG. 1 microwaves are guided within a linear metal boundary forming a waveguide 1. The waveguide cross-section is partially filled with a dielectric absorber 2, where the relative thickness B of the dielectric absorber 2 increases gradually over a distance A, which is on the order of one wavelength and preferably several wavelengths long. The dielectric absorber of relevance to the present invention is any flowable dielectric material, including but not limited to crude oil sludges. Microwaves are introduced into the shallow end 4 of the dielectric absorber 2. Microwave propagation proceeds from the shallow end 4 to the deep end 5 of the microwave beach.

The gradual increase in the depth B of the dielectric absorber 2 over approximately one to several wavelengths results in low reflections of microwaves from the dielectric absorber 2 and excellent power deposition within the dielectric absorber 2. In more technical terms, familiar to those skilled in the microwave arts, the effective or equivalent impedance along the microwave beach changes gradually if the dielectric constant and/or the cross-section of the dielectric absorber 2 within the waveguide 1 also change gradually. The effective or equivalent impedance of the structure is the ratio of electric field to magnetic field at an appropriate point within the waveguide cross-section.

If the change in effective impedance of the waveguide 1 containing the dielectric absorber 2 occurs over approximately one to several wavelengths, the input impedance of the waveguide 1 will change very little from its value with a perfect microwave absorber at the terminating end 5 of the waveguide 1. Thus an approximate impedance match, in which the equivalent impedance of the microwave source equals approximately the complex conjugate of the waveguide input impedance, may be maintained over a wide range of dielectric absorber 2 properties. No microwave reflections occur when there is an impedance match and all of the power from the microwave source is transmitted to the dielectric absorber 2.

Power may be deposited over long distances along the dielectric absorber 2 of a microwave beach, leading to low power flux across the interface between the dielectric absorber 2 and the open volume of the waveguide 3. Low power flux reduces the danger of arcing or localized overheating of the dielectric absorber 2.

It is to be understood that while a simple tapered dielectric absorber is shown in FIG. 1, the thickness B of the dielectric absorber 2 may exhibit other shapes or other functional relations between beach position in the direction of microwave propagation and beach depth or fractional filling of the waveguide cross-section. This is true of both linear and meandering-beach configurations. These other dielectric shapes may also produce low microwave reflectance according to prescriptions calculable by those skilled in the art. The spirit of the present invention encompasses beaches of any shape as long as the thickness or cross-sectional filling of the waveguide by the dielectric absorber changes gradually over a wavelength or several wavelengths.

Figure 2:
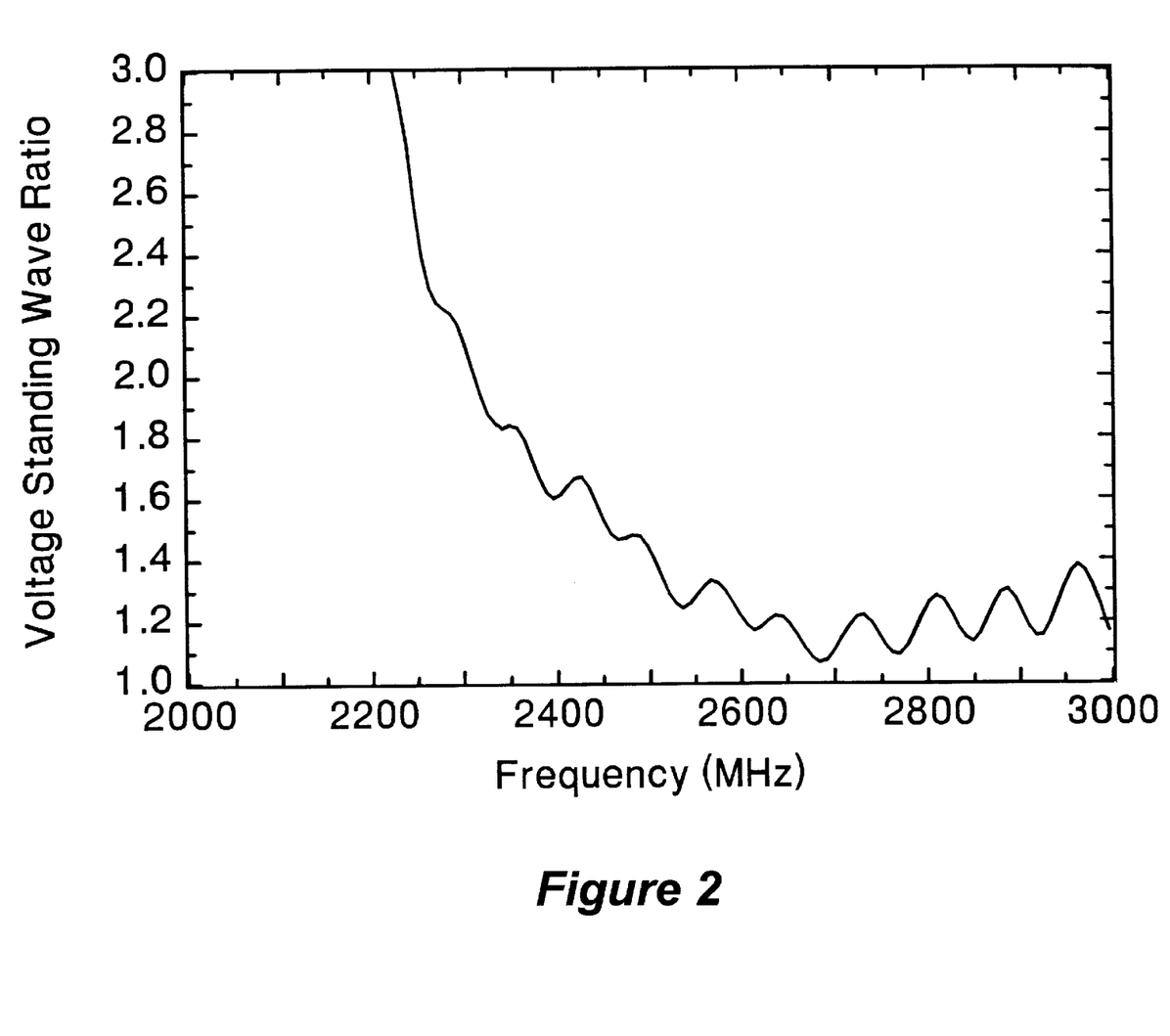
FIG. 2 is an experimental plot of the microwave standing wave ratio versus frequency for a gentle-beach microwave absorber using a linear waveguide. The microwave beach is fabricated using a straight section of WR430 waveguide partially filled with a tapered water volume. Excellent microwave-absorption properties of the gentle-beach configuration are illustrated.

A practical example of the low level of reflections that can be produced along a linear microwave beach, is given in FIG. 2. In FIG. 2, the microwave voltage standing-wave ratio (VSWR) of an experimental microwave beach is plotted as a function of frequency between 2 and 3 GHz. In the experiment, a 1 meter length of standard WR430 rectangular waveguide was sealed at one end and tilted slightly. Water was added to the interior of the waveguide to form a wedge-shaped liquid volume once the water settled against the slanted wall of the waveguide. Measurements of microwave reflections were made with a network analyzer (Hewlett Packard Model 8714B). The VSWR obtained in the tests is less than 1.4 over a very wide bandwidth of 500 MHz.

From this data, it is calculated that at least 97% up to 99.8% of the incident microwave power is absorbed over this 500 MHz bandwidth. Very little change in absorption was observed in the tests as the water surface was disturbed or as the quantity of water was varied by approximately 10%. These insensitivities indicate excellent immunity to changes in fluid properties. Exceptional broad-band, low-reflectance properties and insensitivity to dielectric variations found for gentle microwave beaches are not found in other common microwave heating devices.

Figure 3:
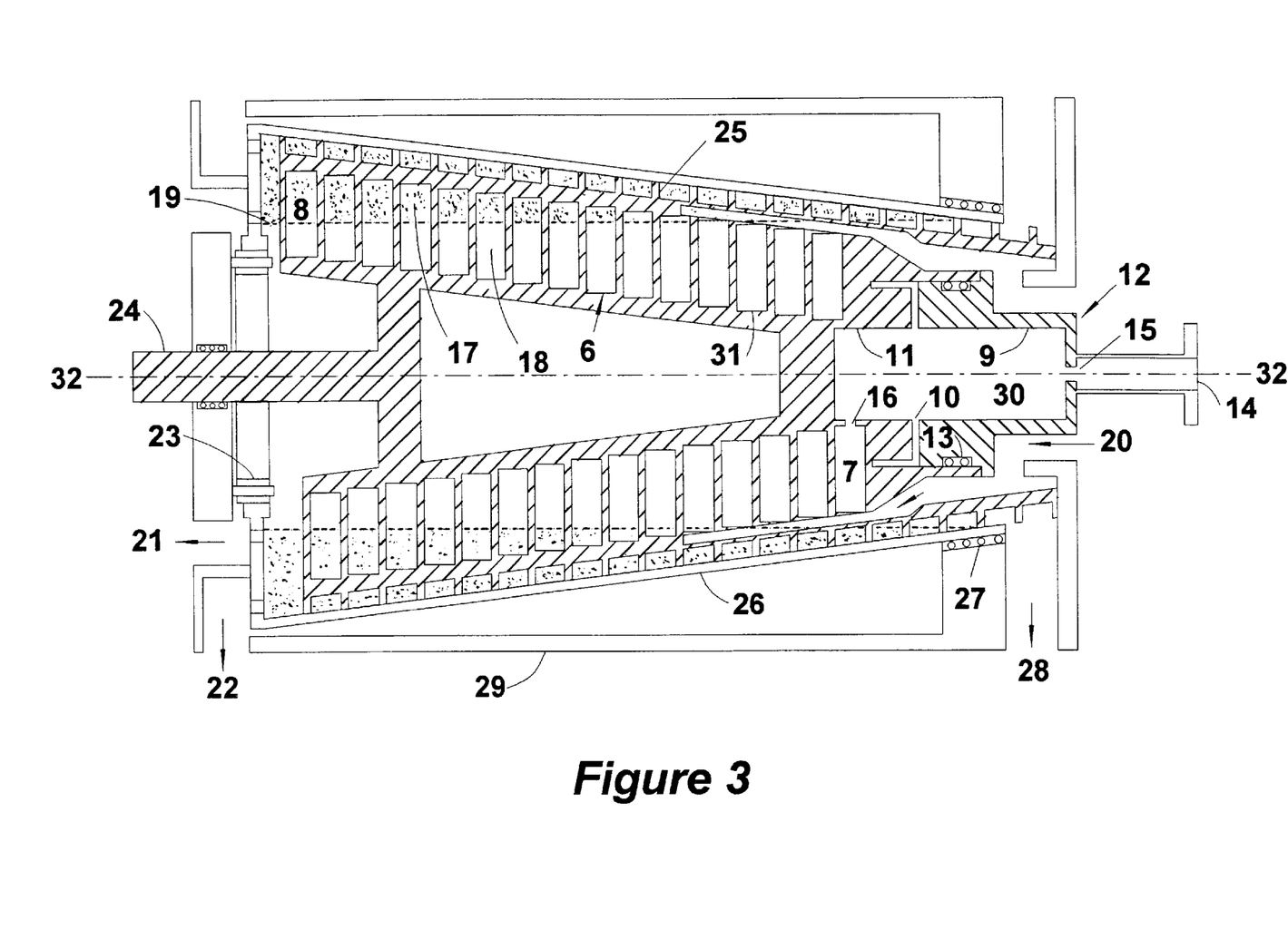
FIG. 3 is a cross-sectional view of a schematic representation of one embodiment of the invention illustrating the construction of a rotateable, expanding-helix waveguide channel within a centrifuge containing a fluid that gradually fills the waveguide cross-section along the expanding helical path of the waveguide channel, forming a gentle microwave beach.

FIG. 3 is a conceptual drawing of one embodiment of the invention that may be used in the separation of oil, water, and solids contained in crude-oil sludges. The invention combines microwave heating with centrifugation in an integrated assembly. Shown in FIG. 3 are examples of the principal elements of the system and means for element interconnection and combined function.

In FIG. 3, a waveguide element 31 having the rectangular cross section shown in the figure is wrapped around the interior of a centrifuge in a fifteen-turn helix that expands in radial distance from the axis of the centrifuge 32 along its length, forming an expanding-helix waveguide channel 6. The expanding-helix waveguide channel 6 is rotateably mounted so that it can rotate about the centrifuge axis 32 at the same speed or a slightly different speed than the outer wall 26 of the centrifuge. The fluid level 19 of the flowable material 17 introduced into the device settles to an approximately constant radial distance from the cylindrical axis of the centrifuge 32 over the length of the centrifuge, under the action of centrifugal forces.

The change in radial distance from the centrifuge axis 32 of the expanding-helix waveguide channel 6, which is partially submerged in the flowable material 17, results in a gradually increasing fluid depth within the expanding-helix waveguide channel 6 along its helical path, as depicted in FIG. 3. Regions of the expanding-helix waveguide channel 6 at radii less than the fluid level 19, do not contain fluid. These regions are shown as waveguide voids 18 in FIG. 3 which contain the ambient atmosphere of the centrifuge. The gradually-changing fluid level along the helical path of the expanding-helix waveguide channel 6 creates the microwave beach configuration, necessary for low microwave reflectance and gradual microwave absorption along the flowable material 17.

Microwaves are transmitted from an external source of microwave power into the input waveguide cross section 7 near the shallow-fluid end of the expanding-helix waveguide channel 6. Microwaves propagate within and along the expanding-helix waveguide channel 6 to the end of the helix at the terminating waveguide cross section 8. At the terminating waveguide cross-section 8, residual microwaves that have not been absorbed or reflected back to the input waveguide cross section 7 may be fully reflected at a short-circuit or an open-circuit termination at the terminating waveguide cross section 8. These residual microwaves are further absorbed as they propagate back to the input waveguide cross section 7.

While a wide range of microwave frequencies will be effective in separating oil-water-solid mixtures within the microwave centrifugal separator, the most reasonable and cost-effective choices will be either 915 MHz or 2,450 MHz. These are the frequencies of the ISM (Industrial, Scientific, and Medical) band that have been set aside by the FCC for industrial processing equipment. A device operating at 915 MHz would be generally larger than a device operating at 2,450 MHz because of the longer wavelength of microwaves at 915 MHz.

As an example, at 915 MHz, utilizing waveguide having a cross-section similar to that of standard WR975 waveguide, with cross-sectional dimensions of approximately 24.8 cm×12.4 cm, the centrifuge illustrated in FIG. 3 would have an average diameter of approximately one meter. The length of the device would be about 2.3 meters. The distance along the helical path of the waveguide would be approximately 30 meters. An order of magnitude estimate of the attenuation along this length can be found from the formula, $$\alpha = \alpha_0 + 2\pi\varepsilon'' \frac{th}{ab} \frac{\lambda_g}{\lambda_o^2} \sin\left(\frac{\pi x}{a}\right) \text{Nepers/meter} \qquad (1)$$

where $\epsilon''$ is the imaginary part of the dielectric permittivity, t is the depth of the fluid, h is the fluid width, a is the waveguide width, b is the waveguide height, $\lambda_g$ is the guide wavelength, $\lambda_o$ is the free-space wavelength, and x is the distance from the short waveguide wall to the center of the fluid.

Substituting average values for t, and x and using the approximate loss index for crude-oil sludges with low water content, 0.05, the attenuation along the expanding-helix waveguide channel 6 shown in FIG. 3 would be roughly 30 dB in one pass and twice this figure for microwaves that reflect from the extreme end of the waveguide. For fluids having higher water content and higher loss indices, absorption would be even more complete. While greater accuracy in estimating absorption may be obtained by those skilled in the art, the present estimate is adequate to demonstrate that excellent microwave absorption will occur along a helical microwave beach like that formed by the expanding-helix waveguide channel 6 shown in FIG. 3.

In order to couple microwaves from a stationary input waveguide 14 into the expanding-helix waveguide channel 6 at the input waveguide cross section 7 a microwave rotary coupler 12 is used between the stationary input waveguide 14 and the input waveguide cross section 7. The basic concept of a rotary microwave coupler is well known in the microwave industry and is described in several early microwave texts. Rotary couplers are commonly used to transmit microwave energy to rotating radar antennas from fixed microwave sources. The rotary coupler 12 of the present invention requires a balancing means for producing stable high-speed rotation that is not necessary in radar applications.

The various basic microwave elements of the rotary coupler 12 are indicated in FIG. 3. The coupler is divided into two sections, a non-rotating section 9 and a rotating section 11. Microwaves are introduced into the non-rotating section 9 and are transmitted to the expanding-helix waveguide channel 6 via the rotating section 11, which is attached to the input waveguide cross section 7. Microwaves from the stationary input waveguide 14 are coupled into a cylindrical cavity 30 through a specially sized stationary aperture 15 in the non-rotating section 9 of the cylindrical cavity 30. The circular-cylindrical cavity dimensions are carefully designed to produce cylindrically symmetric electromagnetic fields within the cavity 30.

An output coupling aperture 16 in the rotating section 11 which rotates with the expanding-helix waveguide channel 6, is placed at the end of the circular-cylindrical cavity opposite the input end. The output coupling aperture 16 opens into the input waveguide cross section 7 of the expanding-helix waveguide channel 6. Because fields within the cylindrical cavity 30 are symmetrical, the output coupling aperture 16 will therefore couple power without variation as it circles the axis of the cavity 30, which coincides with the axis of the centrifuge 32.

Near the middle of the circular-cylindrical cavity 30 is a gap or break that allows the rotating section 11 of the rotary coupler 12 to rotate freely relative to the non-rotating section 9 of the rotary coupler 12. A choke structure 10 is formed at the break to produce a low impedance at the gap within the cavity 30, and to induce very low microwave currents in the vicinity of the bearings 13 which ride between the non-rotating section 9 and the rotating section 11 of the rotary coupler 12.

In the embodiment illustrated in FIG. 3, sludge enters the device through a sludge inlet port 20 at the same end of the device as the stationary input waveguide 14. The sludge flows under centrifugal force to a region just outside of the radius of first few turns of the expanding-helix waveguide channel 6. The rectangular waveguide element 31 of the expanding-helix waveguide channel 6 is perforated or slotted along the short wall which is submerged in the fluid 17 to allow fluid to enter the expanding-helix waveguide channel 6 from the sludge inlet port 20. With fluid 17 introduced within the waveguide element 32 of the expanding-helix waveguide channel 6 microwave power from an external generator is applied to the stationary input waveguide 14, transmitted through the rotary coupler 12 into the expanding-helix waveguide channel 6, and thence into the fluid 17. The fluid 17 is heated, and the oil, water and solids within the fluid 17 separate into radial layers under centrifugal force as the fluid 17 moves to the left in FIG. 3. Perforations or slots are formed over the entire helical path of the waveguide element 31 of the expanding-helix waveguide channel 6 along the short submerged wall to allow free radial movement of the various components of the fluid 17. The perforations or slots can be readily designed to pass fluid and finely divided solids, but effectively block the passage of microwave energy. Microwaves are thereby confined to the interior of the waveguide element of the expanding-helix waveguide channel 6.

At the left end of the device shown in FIG. 3, oil discharge openings 21 are provided at a radius slightly greater than the fluid level 19 to allow discharge of oil, which separates to the inside of the spinning fluid 17 under centrifugal forces. Water discharge openings 22 are provided at a larger radius in the left end wall of the rotating portion of the device to allow discharge of water, which separates to a layer near the outer wall 26 of the device.

Integral with the expanding-helix waveguide channel 6 is a helical-screw conveyor 25 which removes solids that collect along the outer wall 26 of the device. The helical-screw conveyor 25 and the expanding-helix waveguide channel 6 turn in unison at a slightly different rate than the outer wall 26 of the centrifuge. In the FIG. 3 embodiment, the helical-screw conveyor 25 and expanding-helix waveguide channel 6 are driven directly from the main drive shaft 24 of the centrifuge, while the centrifuge outer wall 26 is driven indirectly through a set of gears 23. The gears 23 can be arranged in various ways to drive the outer wall 26 slower or faster than the helical-screw conveyor 25 and the expanding-helix waveguide channel 6. The differential rotation of the helical-screw conveyor 25 relative to the outer wall 26 causes the helical-screw conveyor 25 to move the solids to the right end of the separator and out of the fluid through a solids discharge port 28. This concept for extracting solids is similar to the concept used in conventional sludge separators and is well known to those skilled in the art of centrifuge manufacture.

Although the focus of the present invention and the above detailed description has been upon the separation of emulsions and dispersions, and in particular crude-oil sludges, the invention, in its most general form, may be utilized to apply microwaves to any flowable material. Flowable materials in the context of the present invention consist of any materials that move in a fluid-like manner under the action of centrifugal force. Flowable materials include liquids that contain suspended or dispersed solids, not just pure liquids or liquid mixtures.

The action of the centrifuge included in the invention may be utilized in some applications solely for the purpose of providing a mechanism to support the formation of a barrierless microwave beach. In these applications, the centrifuge would not necessarily be required for the separation of components, and the centrifuge would need only rotate fast enough to maintain the shape of the flowable material. The invention in this case would be used primarily for simple heating of a flowable material, or for enhancing chemical reaction rates of the flowable material, or for some other use that does not involve separation of components.

In applications where flowable material components must be separated, faster centrifuge rotation may be required. While we have focused mainly upon the separation of emulsions and dispersions in this disclosure, the present invention may be utilized to separate any flowable material having variations in density. A non-emulsified flowable material will be separated into radial layers depending upon density in the same way that emulsions and dispersions are separated. Numerous applications exist in the food and chemical industries for the separation of fluids that are not emulsified, but do contain density variations. In the food industry, for example, the invention might be utilized to separate a viscous sugar-containing filler mass into sugar crystals and molasses. Other applications will present themselves to those skilled in the chemical and food-processing arts.

Novel and Unobvious Features of the Invention

The invention is to be distinguished from other inventions disclosing methods and apparatus for applying microwaves to flowable materials, such as emulsions and dispersions, in that it defines a method and apparatus for applying microwaves along a gentle microwave beach formed within a rotating centrifuge.

The present invention has decided advantages over prior art because a long, gentle microwave beach may be formed that does not required a solid dielectric barrier between the flowable material and the microwaves being applied to the flowable material. In fact, there is no material at all required between the flowable material and microwaves. This feature eliminates the deleterious build-up of solid or semi-solid residues on the surface of solid dielectric barriers found in other devices that can lead to locally strong absorption of microwaves within the residues and subsequent destruction of the barriers.

The long, gentle-beach configuration of the present invention results in only minor changes in device input impedance for wide variations in dielectric properties of the flowable material. This feature translates into excellent microwave absorption for a wide range of variation in the flowable material introduced into the system. There is no need for dynamic tuning in order to match the microwave source impedance to the device input impedance as dielectric constants of the flowable material change. Dynamic tuning is required in other devices, however, greatly complicating these other methods and equipment.

Finally, by applying microwaves to a flowable material as it is centrifuged, immiscible components may be rapidly separated in a single device. In other devices and using other techniques, microwaves are first applied to the flowable material in a specialized microwave applicator and then the flowable material is transferred to a centrifuge or left to settle under gravitational forces alone. By applying centrifugation and microwaves simultaneously according to the present invention, a more compact device results and improvements in separation rates may be expected for flowable materials that separate most rapidly and effectively during the period of time that microwave power is applied. In particular, materials in this category include those that experience enhanced separation rates due to non-thermal microwave effects, such as destabilization or reduction of interfacial forces.

While the invention has been described in detail above, it is to be understood that this is by way of example only. Other embodiments of the invention will present themselves according to specific applications of the invention. It is to be understood that the protection granted is to be limited solely by the spirit of the invention and the scope of the following claims:

I claim:

1. A method of applying microwaves to a flowable material comprising the steps of:
   a. generating said microwaves at a preselected frequency and power level;
   b. rotating said flowable material using a centrifuge means wherein said flowable material is rotated about an axis of rotation of said centrifuge means;
   c. rotating a waveguide channel about said axis of rotation, wherein said waveguide channel comprises a waveguide element having a predetermined length, a predetermined waveguide element cross section as a function of position along said length, a waveguide axis normal to said waveguide element cross section, and an input waveguide cross section, and wherein said waveguide element is bent so that said waveguide axis of said waveguide element forms a bent path that is disposed around said axis of rotation, whereby said path formed by said waveguide axis may be circuitous and said path may be formed and a volume enclosing said path may be formed such that the length of said path is substantially greater than any linear dimension of said volume;
   d. flowing a preselected fraction of said flowable material within said waveguide element of said waveguide channel, as said flowable material and said waveguide channel rotate;
   e. providing a predetermined variation in the cross section occupied by said flowable material within said waveguide element cross section along said length of said waveguide element as said flowable material and said waveguide channel rotate so that a microwave beach is formed, whereby reflection of said microwaves which may be applied to said input waveguide cross section may be substantially eliminated from said input waveguide cross section of said waveguide element;
   f. applying said microwaves to said input waveguide cross section of said waveguide element as said waveguide channel and said flowable material rotate, whereby said microwaves are transmitted along said microwave beach to said flowable material and absorbed therein.

2. A method for separating a flowable material according to density comprising the steps of:
   a. providing a microwave generator to generate microwaves of a predetermined frequency and power level;
   b. providing a rotatably mounted expanding-helix-waveguide channel comprising a generally helically-wound waveguide element wound as a variable-radius helix having a first end, an opposed second end and a predetermined cross-section as a function of distance along said waveguide element wherein said helix formed by said waveguide element has a smaller radial distance from the axis of rotation of said expanding-helix waveguide channel at said first end compared to said second end of said waveguide element;
   c. conveying said flowable material into and through said expanding-helix waveguide channel as said expanding-helix waveguide channel rotates;
   d. configuring changes in radial distance of said expanding-helix waveguide channel from said axis of rotation and conveying to said expanding-helix waveguide channel a predetermined amount of said flowable material so that said flowable material, under the action of centrifugal force, occupies a gradually-changing fraction of said cross-section of said waveguide element along said waveguide element of said expanding-helix waveguide channel so that reflectance of said microwaves from said first end of said waveguide element of said expanding-helix waveguide channel is less than a preselected value;
   e. providing a rotary microwave coupler having a stationary microwave input end and a rotatable microwave output end and connecting said rotatable microwave output end of said rotary microwave coupler to said first end of said waveguide element of said expanding-helix waveguide channel and connecting said stationary microwave input end to said microwave generator;
   f. applying said microwaves to said stationary microwave input end of said rotary microwave coupler and transmitting said microwaves through said rotary microwave coupler into said expanding-helix waveguide channel and said flowable material contained within said expanding-helix waveguide channel as said expanding-helix waveguide channel rotates, whereby said flowable material receives said microwaves and said flowable material is separated into radial layers according to density under the action of microwaves and centrifugal forces;

g. removing the materials which have separated into said radial layers.

3. The method of claim 2 including the steps of;

a. providing a rotatably mounted drum spaced from and surrounding said expanding-helix waveguide channel and;

b. collecting material in a collection space between said drum and said expanding-helix waveguide channel.

4. The method of claim 3 wherein said radial layers of said flowable material are withdrawn through openings in said drum at predetermined radii, whereby said flowable material may be separated and removed according to density, which varies with radius.

5. The method of claim 3 further including the steps of;

a. providing openings in said expanding-helix waveguide channel and;

b. ejecting denser components of said flowable material under the action of centrifugal forces and microwaves from interior spaces of said waveguide element of said expanding-helix waveguide channel through said openings into said space between said drum and said expanding-helix waveguide channel, whereby higher density components of said flowable material are separated from lower density components of said flowable material.

6. The method of claim 5, further including the step of removing solid material which is ejected into said collection space.

7. The method of claim 6 including the step of removing solids using a screw conveyor means.

8. The method of claim 6 including the step of removing solids using a scroll conveyor.

9. The method of claim 2, wherein said flowable material is an emulsion or dispersion.

10. The method of claim 2, wherein said flowable material is crude-oil sludge comprising crude oil, water, and solid minerals.

* * * * *